(12) United States Patent
Anderson et al.

(10) Patent No.: US 10,099,580 B2
(45) Date of Patent: Oct. 16, 2018

(54) CHILD RESTRAINT FOR VEHICLE

(71) Applicant: Dorel Juvenile Group, Inc., Foxboro, MA (US)

(72) Inventors: Robert S. Anderson, Narvon, PA (US); David A. Lehman, Lancaster, PA (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/711,448

(22) Filed: Sep. 21, 2017

(65) Prior Publication Data

US 2018/0086235 A1  Mar. 29, 2018

Related U.S. Application Data

(60) Provisional application No. 62/399,731, filed on Sep. 26, 2016.

(51) Int. Cl.
*B60N 2/28* (2006.01)
*A47D 13/10* (2006.01)

(52) U.S. Cl.
CPC ......... *B60N 2/2806* (2013.01); *B60N 2/2821* (2013.01); *B60N 2/2845* (2013.01); *B60N 2/2875* (2013.01); *A47D 13/102* (2013.01)

(58) Field of Classification Search
CPC .. B60N 2/2821; B60N 2/2842; B60N 2/2857; A47D 13/10; A47D 13/102
See application file for complete search history.

(56) References Cited

U.S. PATENT DOCUMENTS

| | | | | |
|---|---|---|---|---|
| 4,025,107 A | * | 5/1977 | Chippa | A47C 3/029 108/116 |
| 5,494,331 A | * | 2/1996 | Onishi | B60N 2/2821 297/256.13 |
| 5,806,924 A | * | 9/1998 | Gonas | B60N 2/2821 160/37 |
| 5,810,436 A | * | 9/1998 | Surot | B60N 2/2821 297/256.13 |
| D401,894 S | * | 12/1998 | Cheng | D12/130 |
| 5,887,944 A | * | 3/1999 | Boost | A47C 3/029 297/258.1 |
| 6,000,753 A | | 12/1999 | Cone | |
| 6,739,659 B2 | * | 5/2004 | Dukes | B60N 2/0232 297/250.1 |
| 6,739,661 B1 | | 5/2004 | Dukes | |
| 7,344,192 B2 | | 3/2008 | Kespohl | |
| 7,464,990 B2 | | 12/2008 | Collias | |
| 7,988,230 B2 | | 8/2011 | Heisey et al. | |
| 8,186,757 B2 | | 5/2012 | Duncan et al. | |
| 8,317,265 B2 | | 11/2012 | Hutchinson et al. | |
| 8,840,184 B2 | * | 9/2014 | Szakelyhidi | B60N 2/2806 297/256.13 |
| 8,899,678 B2 | | 12/2014 | Doolan et al. | |
| D730,651 S | | 6/2015 | Perego | |
| 9,648,962 B1 | * | 5/2017 | Cheng | A47D 13/043 |
| 2007/0214568 A1 | * | 9/2007 | Dodder | A47D 9/04 5/107 |

(Continued)

*Primary Examiner* — Timothy J Brindley
(74) *Attorney, Agent, or Firm* — Barnes & Thornburg LLP

(57) ABSTRACT

A child restraint includes a base adapted to set on a passenger eat and to support a juvenile seat. The juvenile seat is either an infant carrier or a seat suitable for older children.

17 Claims, 5 Drawing Sheets

(56) References Cited

U.S. PATENT DOCUMENTS

2014/0354021 A1* 12/2014 Sedlack .............. B60N 2/2821
  297/216.11
2015/0091348 A1   4/2015 Juchniewicz et al.
2016/0121764 A1*  5/2016 Clement ............. B60N 2/2884
  297/216.11
2016/0144752 A1*  5/2016 Frank ................. B60N 2/2803
  297/216.11

* cited by examiner

CHILD RESTRAINT FOR VEHICLE

PRIORITY CLAIM

This application claims priority under 35 U.S.C. § 119(e) to U.S. Provisional Application No. 62/399,731, filed Sep. 26, 2016, which is expressly incorporated by reference herein.

BACKGROUND

The present disclosure relates to child restraints, and particularly to child restraints for use on passenger seats in vehicles. More particularly, the present disclosure relates to a child restraint including a juvenile seat and a seat support held in place on an underlying passenger seat, for example, by a passenger seat belt.

SUMMARY

A child restraint in accordance with the present disclosure includes a juvenile holder configured to hold a young child or infant. In illustrative embodiments, the juvenile holder includes a seat-support base adapted to set on a passenger seat in a vehicle and a juvenile seat configured to be mounted on the seat-support base after the seat-support base is anchored to the passenger seat using a vehicle seat belt associated with the passenger seat. The juvenile holder is installed on the passenger seat of the vehicle using a process in accordance with the present disclosure in which the seat-support base is rotated about a horizontal axis of rotation until a predetermined orientation of the seat-support base is achieved and then the seat-support base is engaged to the passenger seat and retained in an anchored stationary position on the passenger seat.

In illustrative embodiments, the seat-support base can remain in the anchored stationary position on the passenger seat and a caregiver can mount the juvenile seat on the seat-support base when it is desired to transport a young child or infant in the vehicle. In accordance with the present disclosure, the juvenile seat can be an infant carrier or a seat sized to carry an older child.

In illustrative embodiments, the seat-support base includes a rotatable foundation and a seat mount that is associated with the rotatable foundation and configured to mate with the juvenile seat. The rotatable foundation is free to be rotated relative to the underlying vehicle passenger seat about a horizontal axis of rotation by a caregiver to assume a desired rotational position on the underlying vehicle passenger seat. The seat mount is arranged to slide on and relative to the rotatable foundation along an arcuate path about the horizontal axis of rotation at the option of the caregiver. Once a desired position on the rotatable foundation has been selected, the caregiver can use a seat-mount retainer included in the seat-support base to retain the seat mount in that desired position on the rotatable foundation. In accordance with the present disclosure, a particular final rotational position of the rotatable foundation and a position of the seat mount on the rotational foundation is selected by the caregiver to establish the orientation of a juvenile seat coupled to the seat mount.

In illustrative embodiments, the rotatable foundation of the seat-support base has a convex curved bottom wall that is adapted to face downwardly toward the vehicle passenger seat, rotate about the horizontal axis of rotation relative to the vehicle passenger seat, and then set on a seat bottom of the vehicle passenger seat. The convex curved bottom wall of the rotatable foundation is adapted to mate with underlying portions of a seat bottom and seat back included in vehicle passenger seats of many shapes so that the rotatable foundation can be retained in a stationary position on a wide variety of differently shaped vehicle passenger seats.

In illustrative embodiments, the convex curved bottom wall of the rotatable foundation of the seat-support base has a semi-cylindrical shape. When the rotatable foundation is blocked from further rotation and retained in a stationary position on the vehicle passenger seat using, for example, a vehicle seat belt, a lower exterior section of the semi-circular bottom wall engages an upwardly-facing portion of the seat bottom and an upper exterior section of the semi-circular bottom wall engages a forwardly-facing portion of the seat back regardless of the forward-incline angle of the seat bottom or the rearward-recline angle of the seat back.

In illustrative embodiments, the seat-support base also includes a level indicator that is coupled to the seat mount to rotate therewith about a horizontal axis of rotation during installation of the rotatable foundation on the vehicle passenger seat and movement of the seat mount relative to the rotatable foundation. The level indicator is used by the caregiver in accordance with the present disclosure to establish the orientation of a juvenile seat that is mounted on the seat mount that is coupled to the rotatable foundation.

In illustrative embodiments, to custom fit the rotatable foundation to a vehicle passenger seat regardless of the forward-incline angle of the seat bottom or the rearward-recline angle of the seat back, a caregiver in accordance with the present disclosure need only rotate the rotatable foundation relative to the underlying passenger seat about the horizontal axis of rotation to cause the curved lower exterior section of the semi-cylindrical bottom wall of the rotatable foundation to mate with the seat bottom and the curved upper exterior section of the semi-cylindrical bottom wall of the rotatable foundation to mate with the seat back. The vehicle seat belt then will be adjusted by the caregiver to hold the rotatable foundation in a stationary position on the vehicle passenger seat. The seat mount can be moved on the rotational foundation to establish a proper orientation for a juvenile seat that is mounted on the seat mount.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 3 is a diagrammatic view of the rotatable foundation of FIGS. 1 and 2 after it has been rotated by a caregiver to assume a first rotational position on a relatively SHALLOW-INCLINED vehicle passenger seat and showing the horizontal axis of rotation of the rotatable foundation and rotation of the seat mount about the axis of rotation relative to the rotatable foundation;

FIG. 4 is a view similar to FIG. 3 of the rotatable foundation of FIG. 3 after it has been rotated by a caregiver to assume a different second rotational position and then on a relatively FLAT vehicle passenger seat and showing clockwise rotation of the seat mount about the axis of rotation relative to the rotatable foundation to a position that is closer to the seat back than the position shown in FIG. 3; and FIG. 5 is a view similar to FIGS. 3 and 4 of the rotatable foundation after it has been rotated by a caregiver to assume a different third rotational position on a relatively STEEP-INCLINED vehicle passenger seat and showing counterclockwise rotation of the seat mount about the axis of rotation relative to the rotatable foundation to a position that is further from the seat back than the positions shown in FIGS. 3 and 4.

DETAILED DESCRIPTION

Figure 1:
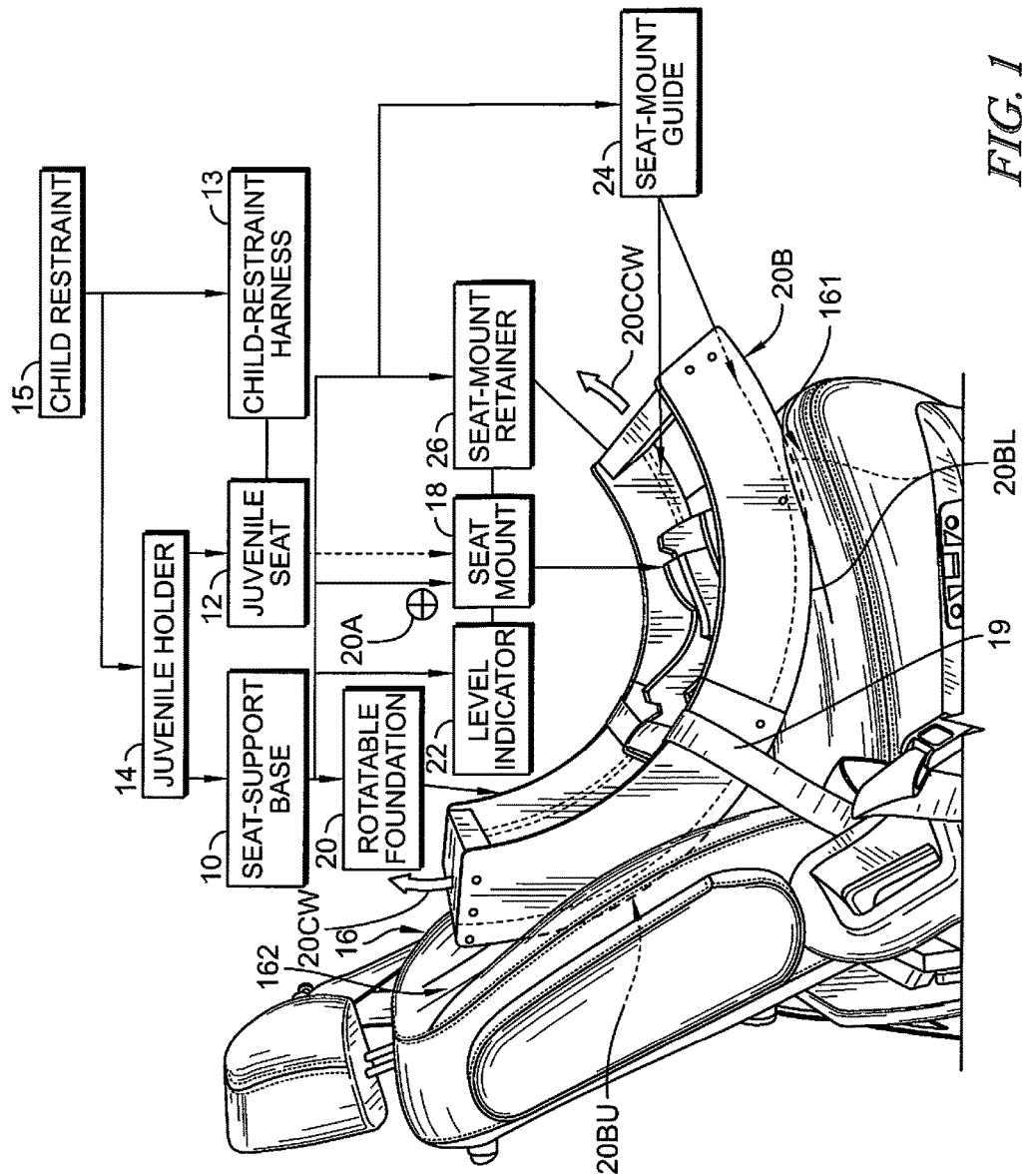
FIG. 1 is a perspective view of a rotatable foundation having a semi-cylindrical bottom wall in accordance with the present disclosure and suggesting diagrammatically that the rotational foundation is included in a seat-support base of a juvenile holder and that the juvenile holder also includes a juvenile seat that is adapted to be coupled to a seat mount that is included in the seat-support base and associated with the rotatable foundation and showing a curved lower exterior section of the semi-cylindrical bottom wall in mating engagement with an upwardly facing (inclined) portion of a seat bottom in a vehicle passenger seat and a curved upper exterior section of the semi-cylindrical bottom wall in mating engagement with a forwardly facing (reclined) portion of a seat back in the vehicle passenger seat and also showing use of a vehicle seat belt to block rotation of the rotatable foundation about a horizontal axis of rotation and retain the rotatable foundation in a stationary rotational position on the vehicle passenger seat.
Figure 3:
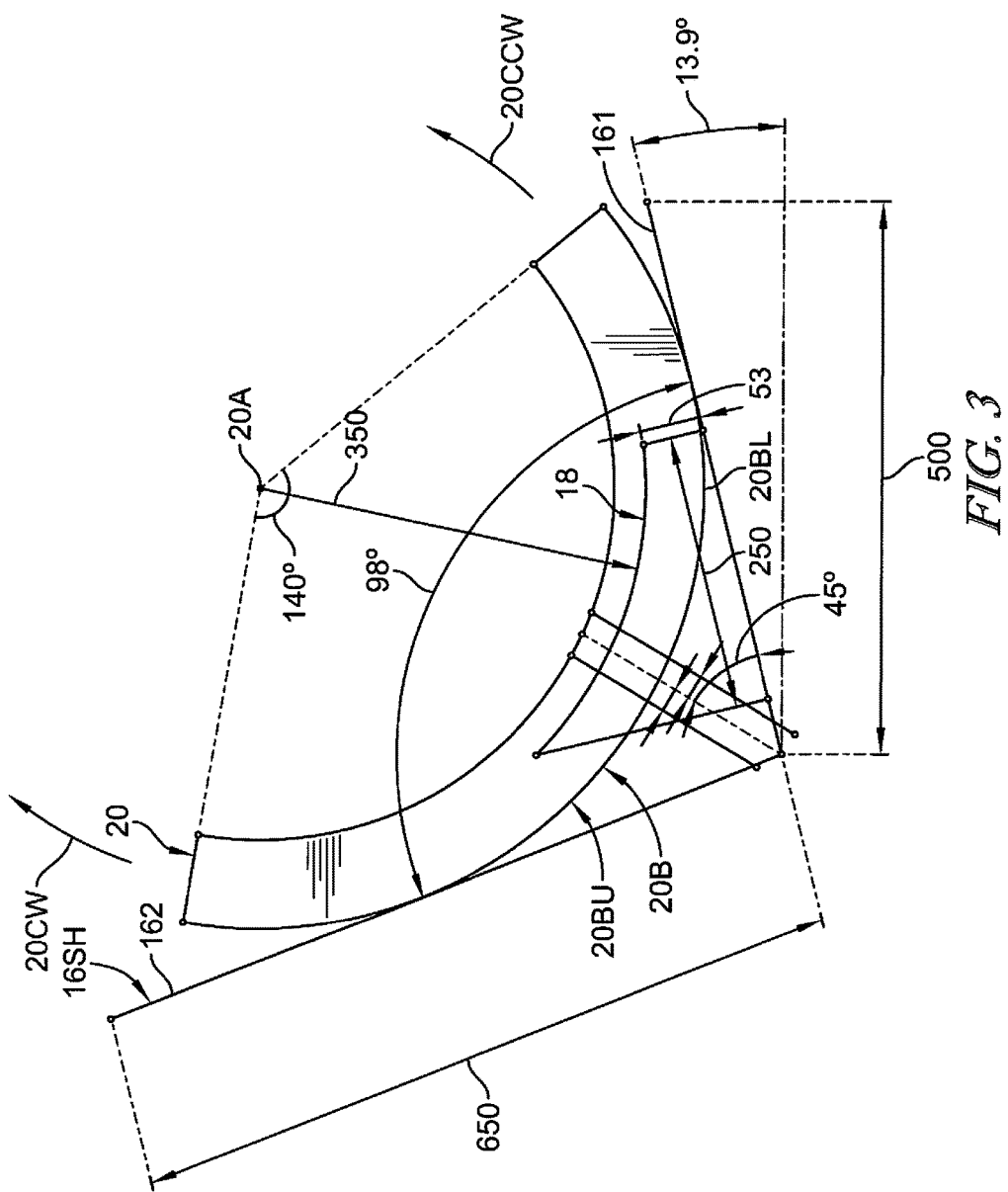
FIGS. 3-5 show rotational movement of the rotatable foundation of the seat-support base about an axis of rotation and also rotational movement of the seat mount about that axis of rotation relative to the rotatable foundation to adapt the seat-support base to set on, in sequence, a SHALLOW-INCLINED vehicle passenger seat shown in FIG. 3, a FLAT vehicle passenger seat shown in FIG. 4, and a STEEP-INCLINED vehicle passenger seat shown in FIG. 5.
Figure 4:
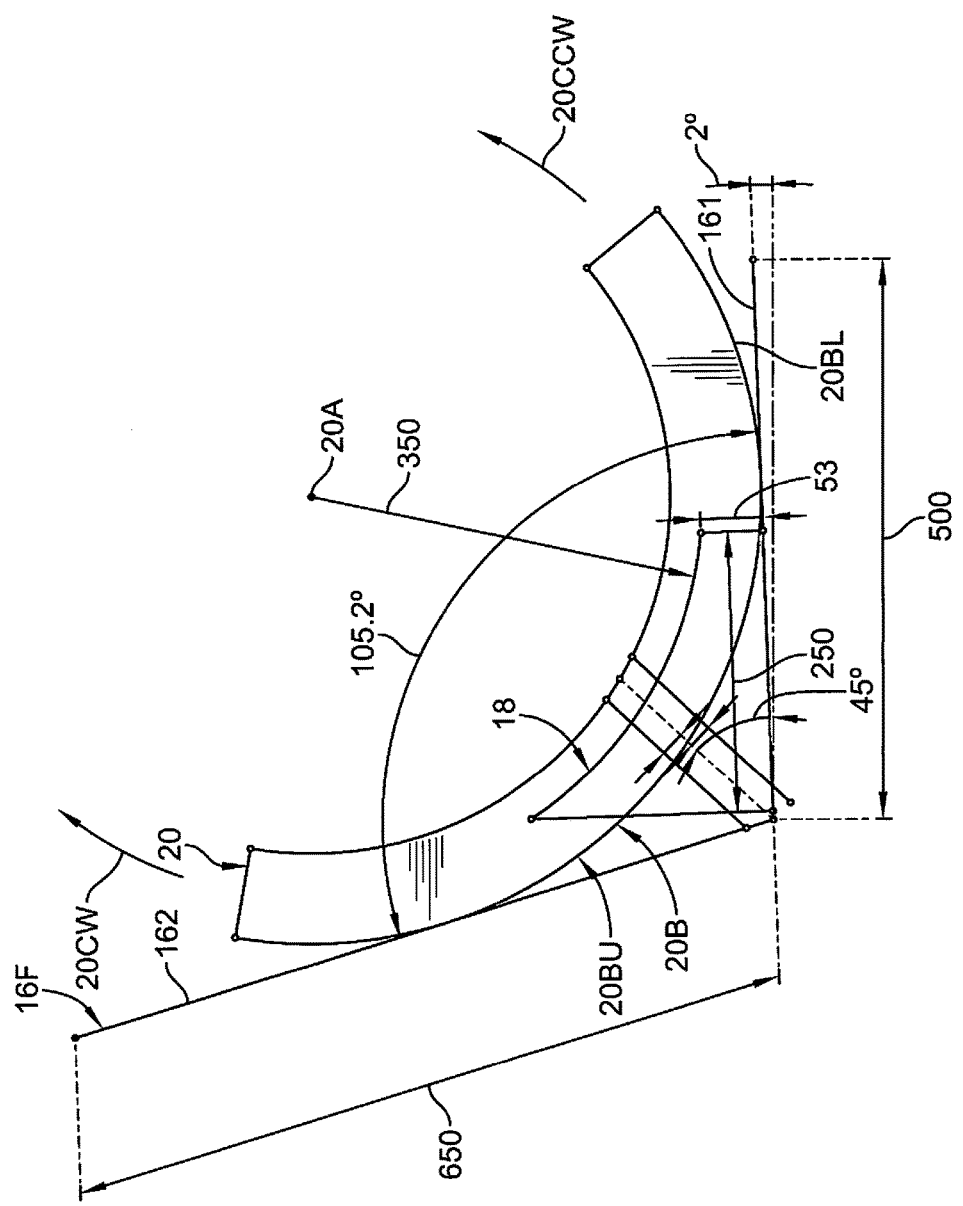
Figure 5:
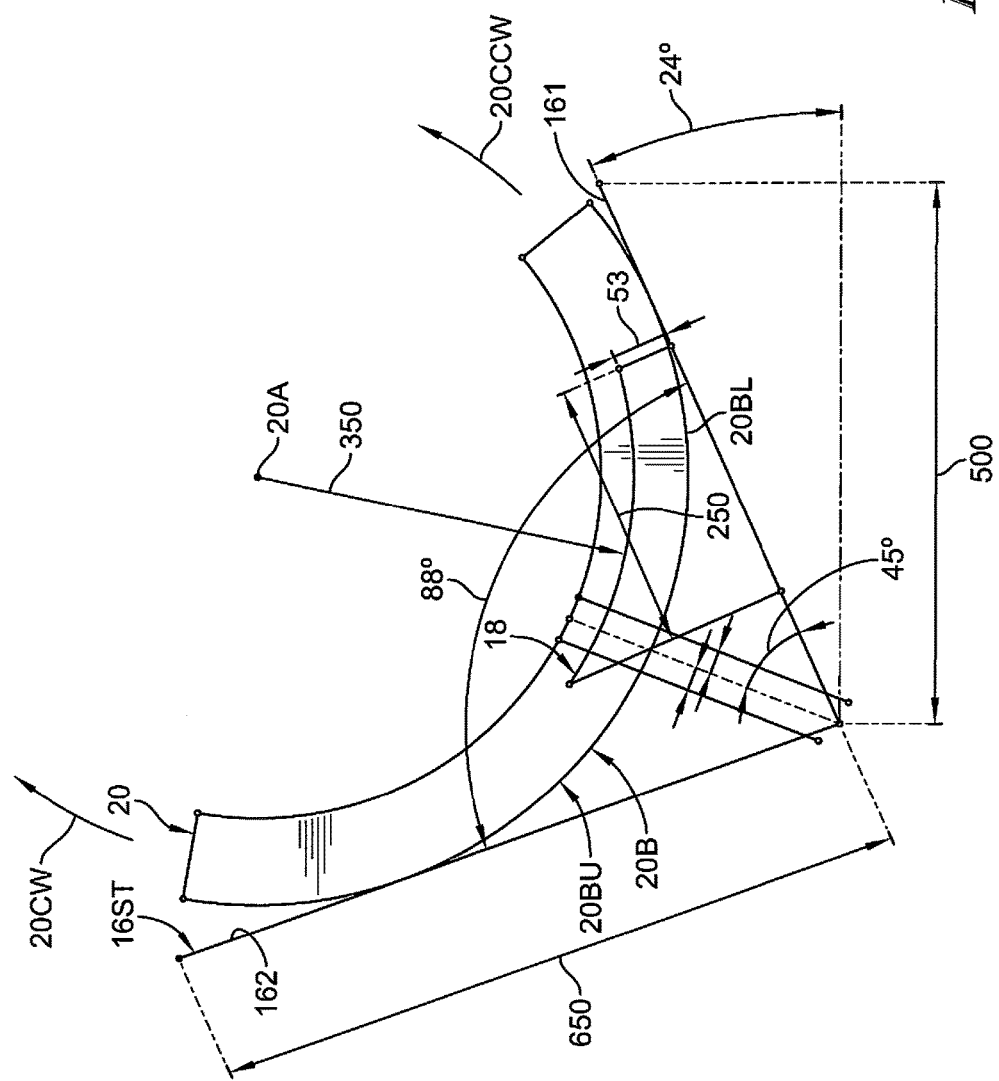

A seat-support base 10 in accordance with the present disclosure cooperates with a juvenile seat 12 to form a juvenile holder 14 for use on a passenger vehicle seat 16 as suggested in FIG. 1. Seat-support base 10 includes a seat mount 18 for juvenile seat 12 and a rotatable foundation 20 as suggested in FIG. 1. Rotatable foundation 20 can be rotated about an axis of rotation 20A at the option of a caregiver as shown in FIGS. 3-5 to establish a new rotational position of rotatable foundation 20 on vehicle passenger seat 16. Seat mount 18 can be rotated about axis of rotation 20A independently of rotatable foundation 20 to change the position of seat mount 18 on rotatable foundation 20 as shown, for example, in FIGS. 3-5 when it is desired to adapt the seat-support base 10 to rest on differently shaped vehicle passenger seats having a variety of seat geometries.

Figure 2:
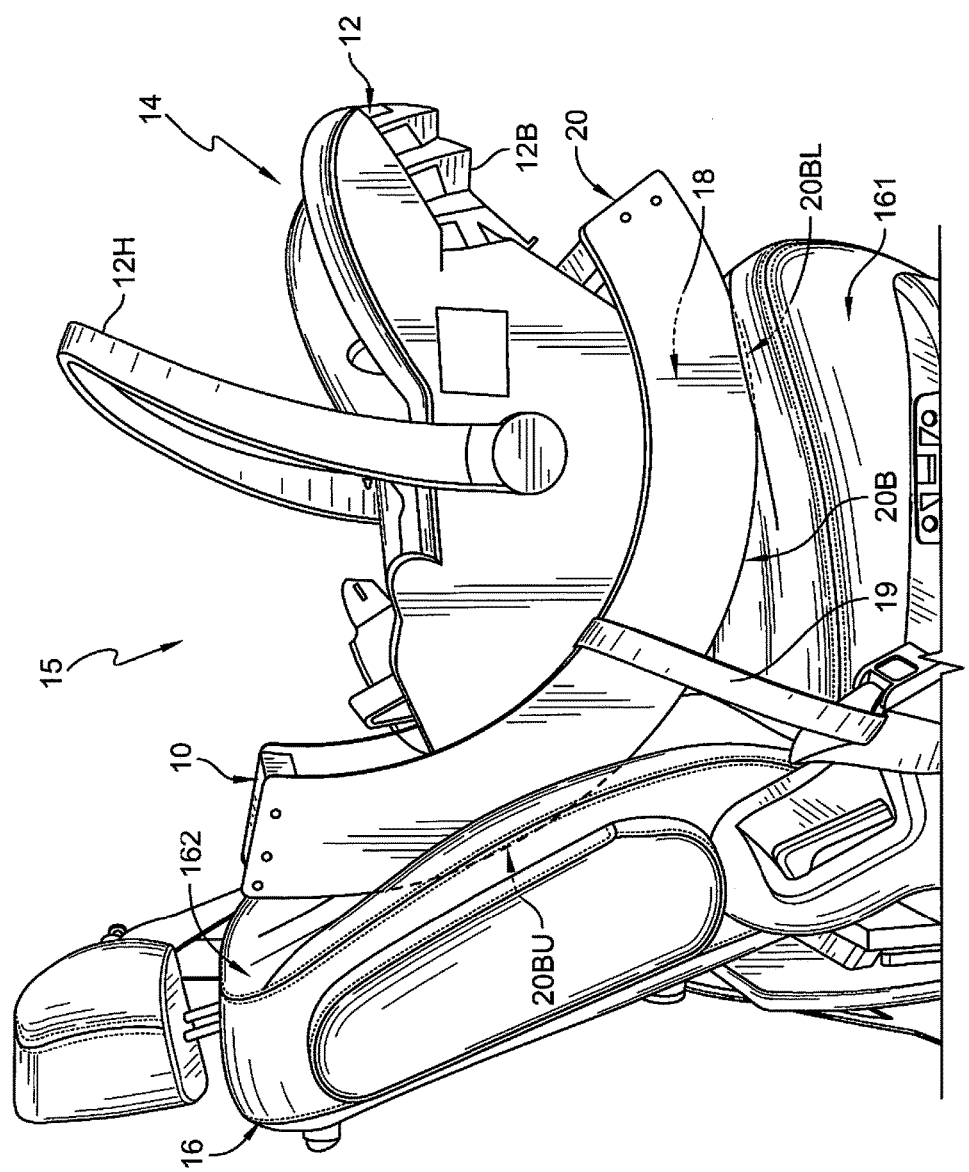
FIG. 2 is a view similar to FIG. 1 showing that the rotatable foundation has been rotated about the horizontal axis of rotation by a caregiver to assume a new rotational position on the vehicle passenger seat that is different than the rotational position shown in FIG. 1 and yet is suitable for use with a juvenile seat such as a rearwardly facing infant carrier and suggesting that the rotatable foundation is anchored in that new rotational position on the vehicle passenger seat using the vehicle seat belt in a manner suggested in FIG. 1.

Rotatable foundation 20 can be retained in a rotational position on passenger vehicle seat 16 selected by a caregiver using, for example, a vehicle seat belt 19 as shown in FIG. 1 to establish a desired orientation of a juvenile seat 12 that has been coupled (using any suitable means) to seat mount 18 as suggested in FIG. 2. Various illustrative rotational positions of rotatable foundation 20 on passenger vehicle seat 16 and of seat mount 18 on rotatable foundation 20 are shown in FIGS. 3-5.

In illustrative embodiments, juvenile seat 12 is an infant carrier including a seat bucket 12B and a carry handle 12H as suggested in FIG. 2. In alternative embodiments, juvenile seat 12 is an upright seat for an older child.

A child-restraint harness 13 is coupled to juvenile seat 12 as suggested diagrammatically in FIG. 1. Child-restraint harness 13 is configured in any suitable manner to restrain an infant or older child seated on juvenile seat 12. Child-restraint harness 13 and juvenile holder 14 cooperate to define a child restraint 15 in illustrative embodiments of the present disclosure as suggested diagrammatically in FIG. 1.

Rotatable foundation 20 includes a downwardly and rearwardly facing semi-cylindrical bottom wall 20B as shown, for example, in FIGS. 1-5. Bottom wall 20B is provided on seat-support base 10 in an illustrative embodiment. When rotatable foundation 20 is placed by a caregiver in a desired rotational position on a vehicle passenger seat 16, a lower exterior section 20BL of semi-cylindrical bottom wall 20B is placed in mating engagement with an upwardly facing portion of a seat bottom 161 of vehicle passenger seat 16 as suggested in FIGS. 1 and 3. At the same time, an upper exterior section 20BU of semi-cylindrical bottom wall 20B is placed in mating engagement with a forwardly facing portion of a seat back 162 of vehicle passenger seat 16 as also suggested in FIGS. 1 and 3.

As suggested in FIG. 1, before rotatable foundation 20 is retained in a stationary position on vehicle passenger seat 16 using, for example, vehicle seat belt 19, a caregiver or other seat installer can rotate rotatable foundation 20 about axis of rotation 20A in either a clockwise direction 20CW or a counterclockwise direction 20CCW to establish a desired rotational position of rotatable foundation 20 on vehicle passenger seat 16. Then vehicle seat belt 19 or any other suitable means can be used to block further rotational movement of rotatable foundation 20 away from the desired rotational position on vehicle passenger seat 16 as shown, for example, in FIG. 1. Juvenile seat 12 can then be coupled to the seat mount 18 associated with the stationary rotatable foundation 20 using any suitable means.

Seat mount 18 is mounted on rotatable frame 20 for movement relative to rotatable frame 20 about axis of rotation 20A as shown diagrammatically in FIGS. 3-5. It is within the scope of the present disclosure to provide any suitable guide-and-lock means for engaging seat mount 18 to move on and/or relative to rotatable frame 20 during movement of seat mount 18 about axis of rotation 20A and for retaining seat mount 18 in a selected stationary position on and/or relative to rotatable frame 20 to establish an orientation of a juvenile seat 12 relative to seat-support base 10 and a vehicle passenger seat 16 carrying seat-support base 10. As suggested diagrammatically in FIG. 1, seat-support base 10 further includes a seat-mount guide 24 coupled to rotatable foundation 20 and to engage and guide seat mount 18 along an arcuate path on rotatable foundation 40 during movement of seat mount 18 relative to rotatable foundation 20 about axis of rotation 20A. Seat-support base 10 also includes a seat-mount retainer 26 for blocking movement of seat mount 18 relative to rotatable foundation 20 at one or more positions so that seat mount 18 is retainer in one or more desired stationary positions on rotatable foundation 20. Examples of such positions are shown in FIGS. 3-5. The units for dimensions 53, 250, 350, 500, 650 in FIGS. 3-5 are millimeters.

As suggested in FIG. 2, rotatable foundation 20 has been rotated about axis of rotation 20A in a counterclockwise direction 20CCW to assume a new rotational position on vehicle passenger seat 16 which is different from the rotational position shown in FIG. 1. This new rotational position is selected by a caregiver to adapt seat-support base 10 to fit a particular vehicle passenger seat geometry.

As suggested in FIG. 3, rotatable foundation 20 has been rotated about axis of rotation 20A to assume a first rotational position on a relatively SHALLOW-INCLINED vehicle passenger seat 16SH characterized by a seat bottom 20B that is included at an angle of about 13.9 degrees relative to the horizontal. Seat mount 18 has been rotated about axis of rotation 20A to move relative to rotatable foundation 20 and to seat back 162 as shown in FIG. 3. Seat mount 18 assumes a desired orientation that is a function of the rotation of each of rotatable foundation 20 and seat mount about axis of rotation 20A. This desired orientation of seat mount 18 establishes the orientation of a juvenile seat 12 mounted on seat mount 18. Seat mount 18 has been oriented to assume a desired orientation that is suitable for a SHALLOW-INCLINED vehicle passenger seat 16SH.

As suggested in FIG. 4, rotational foundation 20 has been rotated about axis of rotation 20A to assume a different second rotational position on a relatively FLAT vehicle passenger seat 16F characterized by a seat bottom 20B that is inclined at an angle of about 2.0 degrees relative to the horizontal. As shown in FIG. 4, seat mount 18 has been rotated about axis of rotation 20A in a clockwise direction relative to the position shown in FIG. 3 to assume a position that is closer to seat back 162 than the position shown in FIG. 3. Seat mount 18 has been oriented to assume a desired orientation that is suitable for a FLAT vehicle passenger seat 16F as shown in FIG. 4.

As suggested in FIG. 5, rotational foundation 20 has been rotated about axis of rotation 20A to assume a different third rotational position on a relatively STEEP-INCLINED vehicle passenger seat 16ST characterized by a seat bottom 20B that is inclined at an angle of about 24 degrees relative to the horizontal. As shown in FIG. 5, seat mount 18 has been rotated in a counterclockwise direction relative to the position shown in FIG. 4 to assume a position that is farther from seat back 162 than the position shown in FIG. 4. Seat mount 18 has been oriented to assume a desired orientation that is suitable for a STEEP-INCLINED vehicle passenger seat 16ST. When FIGS. 3-5 are viewed in series it will be apparent that seat-support base 10 (and any juvenile seat 12 coupled to seat-support base 10) remain in substantially one spatial orientation relative to the ground underlying passenger seat 16 while, in effect, passenger seat 16 rotates around seat-support base 10.

A child restraint 15 in accordance with the present disclosure includes a juvenile holder 14 configured to hold a young child or infant as suggested in FIG. 1. In illustrative embodiments, juvenile holder 14 includes a seat-support base 10 adapted to set on a passenger seat 16 in a vehicle and a juvenile seat 12 configured to be mounted on seat-support base 10 after seat-support base 10 is anchored to passenger seat 16 using a vehicle seat belt 19 associated with passenger seat 16. In an illustrative embodiments, child restraint 15 also includes a child-restraint harness 13 coupled to juvenile seat 12.

Seat-support base 10 can remain in the anchored stationary position on passenger seat 16 and a caregiver can mount juvenile seat 12 on seat-support base 10 when it is desired to transport a young child or infant in the vehicle. In accordance with the present disclosure, juvenile seat 12 can be an infant carrier as shown in FIG. 2 or a seat sized to carry an older child.

Seat-support base 10 includes a rotatable foundation 20 and a seat mount 18 that is associated with the rotatable foundation 20 and configured to mate with juvenile seat 12 as suggested diagrammatically in FIG. 1 and illustratively in FIG. 2. Each of rotatable foundation 20 and seat mount 18 is free to be rotated independently about a horizontal axis of rotation 20A by a caregiver to assume a desired rotational position on an underlying vehicle passenger seat 16 as suggested in FIGS. 1-5. In accordance with the present disclosure, a particular rotational positions of rotatable foundation 20 and of seat mount 18 are selected by the caregiver to establish the orientation of juvenile seat 12 coupled to seat mount 18.

Rotatable foundation 20 has a convex curved bottom wall 20B that is adapted to face downwardly toward, rotate about the horizontal axis of rotation 20A relative to, and then set on seat bottom 161 of the vehicle passenger seat 16 as suggested in FIGS. 1-5. The convex curved bottom wall 20B of rotatable foundation 20 is adapted to mate with underlying portions of a seat bottom and seat back included in a wide variety of differently shaped vehicle passenger seats as suggested in FIGS. 1-5 so that rotatable foundation 20 can be retained in a stationary position on such vehicle passenger seats 16.

The convex curved bottom wall 20B of rotatable foundation 20 of seat-support base 10 has a semi-cylindrical shape. When the rotatable foundation 20 is blocked from further rotation and retained in a stationary position on the vehicle passenger seat 16 using, for example, a vehicle seat belt 19, a lower exterior section 20BL of semi-circular bottom wall 20B engages an upwardly-facing portion of the seat bottom 161 and an upper exterior section 20BU of the semi-circular bottom wall 20B engages a forwardly-facing portion of the seat back 162 regardless of the forward-incline angle of the seat bottom 161 or the rearward-recline angle of the seat back 162 as suggested in FIGS. 1-5.

Seat-support base 10 also includes a level indicator 22 that is coupled to seat mount 18 as suggested in FIG. 1 to rotate therewith about a horizontal axis of rotation 20A during installation of rotatable foundation 20 on the vehicle passenger seat 16. Level indicator 22 provides means for defining a preferred angle (or acceptable range) for the child to be seated in juvenile seat 12 based on the age and size of the child.

Level indicator 22 is used by the caregiver in accordance with the present disclosure to establish the orientation of juvenile seat 12 that is mounted on the seat mount 18 that is coupled to rotatable foundation 20. In illustrative embodiments, to custom fit the rotatable foundation 20 to a vehicle passenger seat 16 regardless of the forward incline angle of seat bottom 161 or the rearward-recline angle of seat back 162, a caregiver in accordance with the present disclosure need only rotate the rotatable foundation 20 about the horizontal axis of rotation 20A to cause a lower exterior section 20BL of the semi-cylindrical bottom wall 20B of rotatable foundation 20 to mate with seat bottom 161 and an upper exterior section 20BU of the semi-cylindrical bottom wall 20B of the rotatable foundation 20 to mate with seat back 162. A circular shape of bottom wall 20B of seat-support base 10 allows rotatable foundation 20 to be rotated by caregiver relative to vehicle passenger seat 16 such that level indicator 22 is reading correctly.

Rotatable foundation 20 rotates about a horizontal axis of rotation 20A and sets on passenger seat 16 in the same manner no matter what angle (i.e., rotational position) it is rotated to. Ideally, juvenile holder 14 is configured to cause the virtual axis of rotation 20A for the angle adjustment of seat-support base 10 to be close to the center of gravity of child restraint 15 such that performance during exposure of child restraint 15 to external forces is substantially unaffected. The angle adjustment range of seat-support base 10 is greater than twelve degrees so as to enhance the fit of seat-support base 10 to a wide variety of differently shaped vehicle passenger seats.

The vehicle seat belt 19 will be adjusted to hold the rotatable foundation 20 in a stationary position on the vehicle passenger seat 16. The belt path of vehicle seat belt 19 is substantially concentric to bottom wall 20B such that vehicle seat belt 19 (or LATCH system) positions itself in the shortest position no matter of the shape and angle of juvenile holder 14.

Rotatable foundation 20 and the independently rotatable seat mount 18 are configured in accordance with the present disclosure to provide easy angle adjustment that can be adjusted in the field by a caregiver to fit child restraint 15 to any vehicle passenger seat while at the same time providing a consistent preferred child seatback angle. Installation can be accomplished in very few steps by rotationally positioning rotatable foundation 20, rotationally positioning seat mount 18, and then anchoring rotatable foundation 20 to vehicle passenger seat 16.

Rotatable foundation 20 is optimized in accordance with the present disclosure to mate between differently shaped vehicle passenger seats and a vehicle seat belt and to (detachably) connect to a forward-facing or rearward facing juvenile seat. Seat-support base 10 has a rotatable foundation 20 having a bottom shape that defines a surface 20B that is circular. Seat-support base 10 also includes a central area that is defined to mate with at least one type of juvenile seat 12 in a forward facing or rearward facing configuration so that the juvenile seat 12 can be locked to self-support base 10 and define a seat back angle for the child occupant of juvenile seat 12. Seat-support base 10, once installed on a vehicle passenger seat 16 in accordance with the present disclosure, has an equally tensioned fit to seat 16 such that and attempt to move seat-support base 10 in any direction relative to seat 16 is substantially limited.

The invention claimed is:

1. A child restraint comprising
a vehicle seat,
a juvenile holder including a seat-support base arranged to set in a stationary position on the vehicle passenger seat and to support a juvenile seat in a stationary orientation relative to the vehicle passenger seat, the seat-support base including a rotatable foundation and a seat mount adapted to anchor the juvenile seat in a stationary position relative to the rotatable foundation and coupled to the rotatable foundation to move therewith about a horizontal rotation axis and relative to the underlying vehicle passenger seat, the rotatable foundation having a downwardly and rearwardly facing convex curved bottom wall comprising a curved lower exterior section adapted to mate with an upwardly facing portion of a seat bottom of the vehicle passenger seat when the seat-support base occupies the stationary position on the vehicle passenger seat and a curved upper exterior section adapted to mate with a forwardly facing portion of a seat back of the vehicle passenger seat when the seat-support base occupies the stationary position on the vehicle passenger seat.

2. The child restraint of claim 1, wherein the convex curved bottom wall has a semi-cylindrical shape.

3. The child restraint of claim 1, wherein the seat-support base further includes a seat-mount guide coupled to the rotatable foundation and to the seat mount and configured to guide the seat mount to move along an arcuate path relative to the rotatable foundation about an axis of rotation during movement of the seat mount induced by a caregiver.

4. The child restraint of claim 3, wherein the seat-support base further includes a seat-mount retainer configured to be activated by a caregiver to block rotation of the seat mount relative to the rotatable foundation along the arcuate path.

5. The child restraint of claim 1, wherein the seat-support base further includes level-indicator means for indicating rotational orientation of a juvenile seat anchored in a stationary position on the seat mount in response to rotation of the rotatable foundation of seat-support base about a horizontal axis of rotation relative to an underlying vehicle passenger seat before the curved lower exterior section of the convex curved bottom wall is mated with an upwardly facing portion of a seat bottom of the vehicle passenger seat and the curved upper exterior section of the convex curved bottom wall is mated with a forwardly facing portion of a seat back of the vehicle passenger seat to establish the stationary position of the seat-support base on the vehicle passenger seat so that a predetermined orientation of a juvenile seat supported on the seat-support base is achieved before seat-support base is retained in the stationary position on the vehicle passenger seat using a vehicle seat belt associated with the vehicle passenger seat.

6. The child restraint of claim 5, wherein the convex curved bottom wall has a semi-cylindrical shape.

7. The child restraint of claim 5, wherein the convex curved bottom wall subtends an angle of about 140°.

8. The child restraint of claim 5, wherein the seat-support base further includes a seat-mount guide coupled to the rotatable foundation and configured to guide the seat mount to move along an arcuate path relative to the rotatable foundation about the horizontal axis of rotation.

9. The child restraint of claim 8, wherein the seat-support base further includes a seat-mount retainer configured to be activated by a caregiver to block rotation of the seat mount relative to the rotatable foundation along the arcuate path.

10. A child restraint comprising
a juvenile holder including a seat-support base adapted to set in a stationary position on a vehicle passenger seat and adapted to support a juvenile seat in a stationary orientation relative to the vehicle passenger seat, the seat-support base including a rotatable foundation and a seat mount adapted to anchor the juvenile seat in a stationary position relative to the rotatable foundation and coupled to the rotatable foundation to move therewith, the rotatable foundation having a downwardly and rearwardly facing convex curved bottom wall comprising a curved lower exterior section adapted to mate with an upwardly facing portion of a seat bottom of the vehicle passenger seat when the seat-support base occupies the stationary position on the vehicle passenger seat and a curved upper exterior section adapted to mate with a forwardly facing portion of a seat back of the vehicle passenger seat when the seat-support base occupies the stationary position on the vehicle passenger seat,
wherein the curved lower and upper exterior sections of the convex curved bottom wall share a common center of curvature.

11. A child restraint comprising
a juvenile holder including a seat-support base adapted to set in a stationary position on a vehicle passenger seat and adapted to support a juvenile seat in a stationary orientation relative to the vehicle passenger seat, the seat-support base including a rotatable foundation and a seat mount adapted to anchor the juvenile seat in a stationary position relative to the rotatable foundation and coupled to the rotatable foundation to move therewith, the rotatable foundation having a downwardly and rearwardly facing convex curved bottom wall comprising a curved lower exterior section adapted to mate with an upwardly facing portion of a seat bottom of the vehicle passenger seat when the seat-support base occupies the stationary position on the vehicle passenger seat and a curved upper exterior section adapted to mate with a forwardly facing portion of a seat back of the vehicle passenger seat when the seat-support base occupies the stationary position on the vehicle passenger seat,
wherein the seat-support base further includes level-indicator means for indicating rotational orientation of a juvenile seat anchored in a stationary position on the seat mount in response to rotation of the rotatable foundation of seat-support base about a horizontal axis of rotation relative to an underlying vehicle passenger seat before the curved lower exterior section of the convex curved bottom wall is mated with an upwardly facing portion of a seat bottom of the vehicle passenger seat and the curved upper exterior section of the convex curved bottom wall is mated with a forwardly facing portion of a seat back of the vehicle passenger seat to establish the stationary position of the seat-support base on the vehicle passenger seat so that a predetermined orientation of a juvenile seat supported on the seat-support base is achieved before seat-support base is retained in the stationary position on the vehicle passenger seat using a vehicle seat belt associated with the vehicle passenger seat,
wherein the curved lower and upper exterior sections of the convex curved bottom wall share a common center of curvature.

12. A process for installing a juvenile holder on a vehicle passenger seat, the process compromising the steps of
arranging a juvenile holder including a seat-support base adapted to engage and support a juvenile seat in a temporary position on a vehicle passenger seat including a seat bottom and a seat base extending upwardly away from the seat bottom,
rotating the seat-support base about a horizontal axis of rotation while the seat-support base overlies the seat bottom until a level indicator associated with the juvenile holder indicates that a predetermined orientation of the juvenile holder relative to the vehicle passenger seat has been achieved,
engaging a convex curved bottom wall of the seat-support base with an upwardly facing portion of the seat bottom and a forwardly facing portion of the seat back, and
anchoring seat-support base in a stationary position on the vehicle passenger seat using a vehicle seat belt associated with the vehicle passenger seat to retain the juvenile holder in the predetermined orientation on the vehicle passenger seat so that a juvenile seat mounted on the seat-support base is retained in a stationary orientation relative to the vehicle passenger seat.

13. The process of claim 12, wherein the seat-support base includes a rotatable foundation having the convex curved bottom wall and a seat mount coupled to rotate with the rotatable foundation during rotation of the seat-support base about the horizontal axis of rotation and independently relative to the rotatable foundation about the horizontal axis of rotation, the convex bottom wall includes a curved lower exterior section that engages the upwardly facing portion of the seat bottom during the engaging step and a curved upper exterior section that engages the forwardly facing portion of the seat back during the engaging step.

14. The process of claim 13, wherein the level indicator is coupled to the seat mount to rotate therewith about the horizontal axis of rotation during the rotating step.

15. The process of claim 12, wherein the level indicator is coupled to the seat-support base to rotate therewith about the horizontal axis of rotation during the rotating step.

16. The process of claim 15, wherein a juvenile seat is coupled to the seat-support base to rotate therewith about the horizontal axis of rotation during the rotating step.

17. The process of claim 12, wherein the seat-support base includes a rotatable foundation having a convex curved bottom wall and a seat mount engaged to the rotatable foundation for movement relative to the rotatable foundation and the rotating step comprises the steps of rotating the rotatable foundation about the horizontal axis of rotation and rotating the step mount about the horizontal axis of rotation relative to the rotatable foundation.

* * * * *